United States Patent
Williamson et al.

(10) Patent No.: US 7,774,582 B2
(45) Date of Patent: Aug. 10, 2010

(54) RESULT BYPASSING TO OVERRIDE A DATA HAZARD WITHIN A SUPERSCALAR PROCESSOR

(75) Inventors: David James Williamson, Austin, TX (US); Glen Andrew Harris, Austin, TX (US); Stephen John Hill, Austin, TX (US)

(73) Assignee: ARM Limited, Cambridge (GB)

( * ) Notice: Subject to any disclaimer, the term of this patent is extended or adjusted under 35 U.S.C. 154(b) by 1011 days.

(21) Appl. No.: 11/137,792

(22) Filed: May 26, 2005

(65) Prior Publication Data

US 2006/0271768 A1 Nov. 30, 2006

(51) Int. Cl.
G06F 9/30 (2006.01)
G06F 9/40 (2006.01)

(52) U.S. Cl. .................. 712/218; 712/216; 712/217; 712/219

(58) Field of Classification Search .......... 712/216–219
See application file for complete search history.

(56) References Cited

U.S. PATENT DOCUMENTS

| | | | | |
|---|---|---|---|---|
| 5,471,593 A | * | 11/1995 | Branigin | 712/235 |
| 5,509,130 A | * | 4/1996 | Trauben et al. | 712/215 |
| 5,640,588 A | * | 6/1997 | Vegesna et al. | 712/23 |
| 5,805,852 A | * | 9/1998 | Nakanishi | 712/218 |
| 5,958,041 A | * | 9/1999 | Petolino et al. | 712/214 |
| 6,073,231 A | * | 6/2000 | Bluhm et al. | 712/218 |
| 6,101,597 A | | 8/2000 | Colwell et al. | |
| 6,408,381 B1 | * | 6/2002 | Gearty et al. | 712/225 |
| 6,587,940 B1 | * | 7/2003 | Soltis et al. | 712/216 |
| 6,889,317 B2 | * | 5/2005 | Sami et al. | 712/218 |
| 6,922,760 B2 | * | 7/2005 | Nguyen | 711/154 |
| 2002/0108026 A1 | * | 8/2002 | Balmer et al. | 712/218 |
| 2002/0169942 A1 | * | 11/2002 | Sugimoto | 712/24 |
| 2003/0120902 A1 | * | 6/2003 | Kottapalli et al. | 712/216 |
| 2003/0163672 A1 | * | 8/2003 | Fetzer et al. | 712/218 |
| 2003/0200421 A1 | * | 10/2003 | Crook et al. | 712/215 |
| 2004/0255099 A1 | * | 12/2004 | Kromer | 712/219 |
| 2006/0095732 A1 | * | 5/2006 | Tran et al. | 712/217 |
| 2006/0168583 A1 | * | 7/2006 | Basso et al. | 718/102 |
| 2006/0259741 A1 | * | 11/2006 | Hastie | 712/215 |

FOREIGN PATENT DOCUMENTS

JP 2000-347861 12/2000

OTHER PUBLICATIONS

UK Examination Report dated Dec. 18, 2009 for GB 0606086.7.

* cited by examiner

*Primary Examiner*—Eddie P Chan
*Assistant Examiner*—William B Partridge
(74) *Attorney, Agent, or Firm*—Nixon & Vanderhye P.C.

(57) ABSTRACT

A data processing system including multiple execution pipelines each having multiple execution stages E1, E2, E3 may have instructions issued together in parallel despite a data dependency therebetween if it is detected that the result operand value for the older instruction will be generated in an execution stage prior to an execution stage which requires that result operand value as an input operand value to the younger instruction and accordingly cross-forwarding of the operand value is possible between the execution pipelines to resolve the data dependency.

10 Claims, 4 Drawing Sheets

RESULT BYPASSING TO OVERRIDE A DATA HAZARD WITHIN A SUPERSCALAR PROCESSOR

BACKGROUND OF THE INVENTION

1. Field of the Invention

This invention relates to data processing systems. More particularly, this invention relates to the control of instruction issue within superscalar data processing systems.

2. Description of the Prior Art

It is known to provide superscalar data processing systems including multiple instruction pipelines so that multiple streams of program instructions can be executed in parallel thereby increasing processor throughput. A problem with such systems is that data dependencies between program instructions can require that an output of one instruction is used as an input to another instruction such that, if those two instructions are issued together, then the true input to the younger instruction will not be available when required since it will not yet have been calculated by the older instruction. In order to deal with this situation it is known to provide data dependency hazard checking mechanisms which are responsive to the source and destination register specifiers of program instructions to be issued to identify any combinations of instructions with a data dependency that would cause an error if those instructions were issued together. If such a data hazard is detected, then the younger instruction(s) can be held back and issued in a later cycle such that the data hazard will not arise. This reduces processing performance since the parallel execution capabilities are not fully used.

SUMMARY OF THE INVENTION

Viewed from one aspect the present invention provides an apparatus for processing data, said apparatus comprising:

a plurality of execution pipelines for executing in parallel program instructions of a sequence of program instruction to generate output operand values, respective execution pipelines including a corresponding plurality of execution stages, output operand values for differing types of program instructions being generated in different execution stages;

data hazard checking logic operable to detect a data dependency hazard between candidate program instructions to be issued in parallel to respective execution pipelines of said plurality of execution pipelines whereby an output operand value for a first of said candidate program instructions is an input operand value of a second of said candidate program instructions and to generate a data dependency hazard signal if such a data dependency hazard is detected;

data hazard override logic operable to detect if said output operand value of said first of said candidate program instructions will be generated before said input operand value for said second of said candidate program instruction will be required and to generate a data hazard override signal;

instruction issue control logic operable in response to receipt of said data hazard override signal to override any data dependency hazard signal and to permit said first of said candidate program instructions and said second of said candidate program instructions to issue in parallel; and operand forwarding logic operable to control said output operand value of said first of said candidate program instruction to be transmitted between execution pipelines to serve as said input operand value of said second of said candidate program instructions.

The invention recognizes that within a processing system in which there are multiple execution stages in each execution pipeline with output operand values being generated at different execution stages depending upon the type of program instruction concerned, it is possible for some combinations of program instructions to be issued together so as to be executed in parallel even though a data dependency exists between the two instructions. This is possible if the data value which is resulting in the data dependency hazard is one where the output operand value will be generated in an execution stage preceding the execution stage in which it is required to form an input operand for the dependent program instructions if those instructions are issued together. In this circumstance, the combinations of program instructions which may be issued together in parallel despite a detected data dependency hazard can be detected and a signal arising from this detection used to override the data dependency hazard. The mechanism may also be used to control the transmission/forwarding of an output operand value between the execution pipelines so as to serve as a necessary input operand value as the dependent program instructions progress along the instruction pipelines.

It will be appreciated that the present technique may be used to provide for the overriding of data dependency hazard checking in systems having multiple instruction pipelines including more than two instruction pipelines, but the technique is well suited to systems having two instruction pipelines and which perform in order program instruction execution. If out of order execution is permitted, then the problems associated with data dependencies can be mitigated at the cost of a considerable increase in the complexity needed to deal with the out of order control.

The situation in which output operand values are available at different execution stages is particularly likely to arise when the execution stages concerned have different instruction execution logic operable to perform different data processing operations. Within such systems the execution workload is divided between the execution stages with different types of manipulation being performed at different stages. Some instructions may require multiple different types of manipulation to be performed with these being performed in different execution stages, e.g. a shift in one stage followed by an ALU operation in another stage.

The different instruction execution logic provided in the respective execution stages can take a variety of different forms, but in preferred embodiments comprises logic operable to perform one of more of the data shift operation, an ALU operation and a load/store operation. These operations can be conveniently arranged within the pipelines to be performed in sequence at respective execution stages.

With this arrangement, candidate program instructions having a data dependency hazard therebetween which can nevertheless be issued together in parallel include a shift program instruction followed by an ALU program instruction, a shift program instruction followed by a load/store program instruction and an ALU program instruction followed by a load/store program instruction. In all of these cases, the output operand value of the earlier instruction will be available within the execution pipeline stages prior to it being required as an input operand value for the following program instruction which has been issued in parallel therewith.

Viewed from another aspect the present invention provides apparatus for processing data, said apparatus comprising:

a plurality of execution pipeline means for executing in parallel program instructions of a sequence of program instruction to generate output operand values, respective execution pipelines including a corresponding plurality of execution stage means, output operand values for differing types of program instructions being generated in different execution stage means;

data hazard checking means for detecting a data dependency hazard between candidate program instructions to be issued in parallel to respective execution pipeline means of said plurality of execution pipeline means whereby an output operand value for a first of said candidate program instructions is an input operand value of a second of said candidate program instructions and generating a data dependency hazard signal if such a data dependency hazard is detected;

data hazard override means for detecting if said output operand value of said first of said candidate program instructions will be generated before said input operand value for said first of said candidate program instruction will be required and generating a data hazard override signal;

instruction issue control means responsive to receipt of said data hazard override signal for overriding any data dependency hazard signal and permitting said first of said candidate program instructions and said second of said candidate program instructions to issue in parallel; and operand forwarding means for controlling said output operand value of said first of said candidate program instruction to be transmitted between execution pipeline means to serve as said input operand value of said second of said candidate program instructions.

Viewed from a further aspect the present invention provides a method of processing data, said method comprising the steps of:

executing in parallel program instructions of a sequence of program instruction within a plurality of execution pipelines to generate output operand values, respective execution pipelines including a corresponding plurality of execution stages, output operand values for differing types of program instructions being generated in different execution stages;

detecting a data dependency hazard between candidate program instructions to be issued in parallel to respective execution pipelines of said plurality of execution pipelines whereby an output operand value for a first of said candidate program instructions is an input operand value of a second of said candidate program instructions and generating a data dependency hazard signal if such a data dependency hazard is detected;

detecting if said output operand value of said first of said candidate program instructions will be generated before said input operand value for said first of said candidate program instruction will be required and generating a data hazard override signal;

in response to generation of said data hazard override signal, overriding any data dependency hazard signal and permitting said first of said candidate program instructions and said second of said candidate program instructions to issue in parallel; and controlling said output operand value of said first of said candidate program instruction to be transmitted between execution pipelines to serve as said input operand value of said second of said candidate program instructions.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
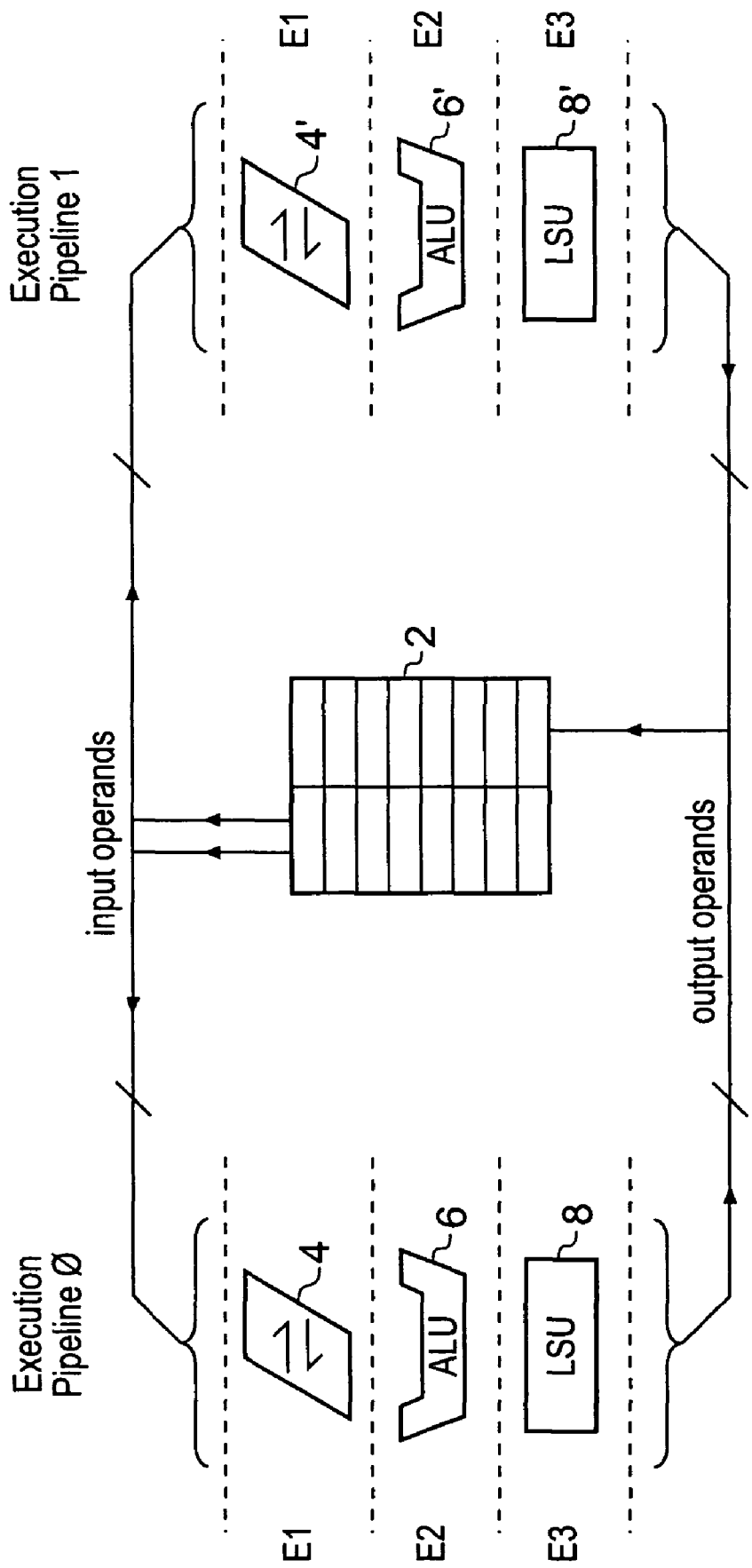
FIG. 1 schematically illustrates execution stages of multiple execution pipelines accessing a shared register bank.

FIG. 1 schematically illustrates a portion of a multiple issue data processing system including two execution pipelines. It will be appreciated that FIG. 1 is a highly schematic representation and in practice a considerable number of additional functional elements will be present and required within the system as a whole. These functional elements are not illustrated in FIG. 1 for the sake of simplicity.

FIG. 1 illustrates how each of the execution pipelines draws its source input operand values from a shared register bank 2. The destination output operand values from each of the execution pipelines are similarly written back into the register file 2. Each of the execution pipelines in this example embodiment is shown as having three execution stages E1, E2 and E3 respectively including a shifter 4, 4', an arithmetic logic unit 6, 6' and a load/store unit 8, 8'.

Instructions passing along the respective execution pipelines together with the selected source operand values may be subject to shifting operations by the shifters 4, 4', arithmetic and logical operations by the arithmetic logic units, 6, 6' and memory access operations by the load/store units 8, 8'. It will be appreciated that a different number of execution stages may also be used and that the disposition of the relevant instruction execution logic, namely the shifters 4, 4', the arithmetic logic units 6, 6' and the load/store units 8, 8' may be varied depending upon the particular implementation. It will also be appreciated that many or most instructions will only use a subset of these different instruction execution circuits to perform their intended processing operation. As an example, an instruction which is purely a shift operation will generally only use a shifter 4, 4'. The output operand value from that shift operation will be available by the end of the first execution stage E1. Similarly, a purely arithmetic/logic instruction will likely only employ an ALU unit 6, 6' and its output operand value(s) will be available at the end of the second execution stage E2. The arithmetic logic units 6, 6' do not require their input operand values to be present until the beginning of the second execution stage E2. Accordingly, if these input operand values are calculated using a shift operation in the other of the execution pipelines, then this shifted value will be present by the end of the first execution stage E1 in that other execution pipeline and can be forwarded between the execution pipelines to serve as the input operand value for the ALU unit 6, 6' requiring it in time for the beginning of the second execution stage E2. This represents cross-forwarding of operands for instructions issued in parallel into the two execution pipelines. In a similar way, the load/store units 8, 8' do not require their input operand value(s) until the beginning of the third execution stage E3 and accordingly may received as input operand values from the neighboring execution pipeline output operand values that have been generated by either the ALU unit 6, 6' or the shifter 4, 4'.

Figure 2:
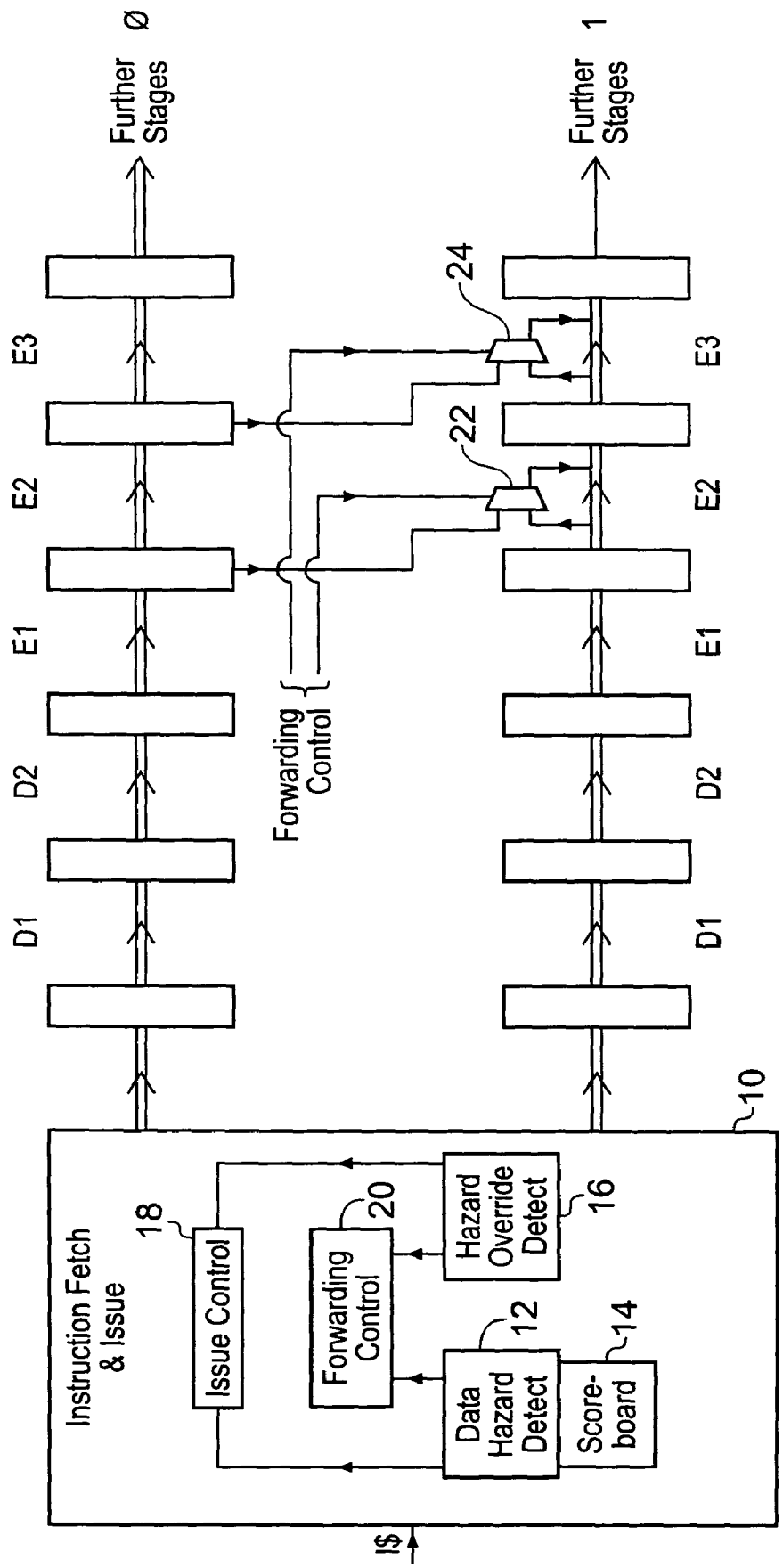
FIG. 2 schematically illustrates a portion of two instruction pipelines including data hazard detection, hazard override and cross-forwarding logic.

FIG. 2 schematically illustrates a portion of two instruction pipelines using the above described techniques. A fetch and instruction issue block 10 serves to fetch multiple program instructions (candidate program instructions) from an instruction cache and to detect whether these require to be issued individually (down pipeline 0) or may be issued in parallel down the two pipelines (pipelines 0 and 1). A data hazard detection unit 12 serves to examine (partially decode) the instructions which are candidate instructions for being issued in parallel to determine if the young instruction requires as an input operand value a within a register which is serving as a destination register for the older candidate program instruction to be issued. This is data hazard detection as is conventionally performed and can employ a scoreboard 14 to keep track of data dependencies. Such standard data hazard detection not only applies to candidate program instructions being issued in parallel along the execution pipelines but may also arise when seeking to issue an instruction which has a dependency upon an instruction which is already progressing along the execution pipelines but will not have generated its destination (output) value in time for when this is required by the candidate program instruction being examined. This type of data hazard detection between pending program instructions within an instruction pipeline is known and will not be described further herein.

The present technique provides the additional capability of overriding detected data hazards using hazard override logic 16 when these are occurring between candidate instructions for issue in parallel if those instructions are such that the output data being generated by the older instruction which is required by the younger instruction will be so generated before that data is actually required by the younger instruction as the two instructions progress in parallel along the execution pipelines. If this condition is satisfied, then the data concerned can be cross-forwarded between the execution pipelines and the two instructions can be issued together. The issue control logic 18 is responsive to both the conventional data hazard detection logic 12 and the hazard override detection logic 16 to issue either a single or two instructions from the candidate pair of instructions being examined. If forwarding is required between the execution pipelines and is detected as being possible given the timings involved by the hazard override detection logic 16, then this forwarding is controlled by forwarding control logic 20.

Within the execution pipelines themselves these are respectively preceded by decoder stages before the multiple execution stages are reached. The execution stages can perform their different forms of data manipulation as previously described. Instruction specifying decoded control signals and operands are passed between the stages as indicated by the double lined arrow between the stages. When required, an operand can be forwarded between the execution pipelines using the multiplexers 22, 24 to replace a current operand value (or effectively space holder) progressing along the pipeline for that operand with an operand value selected from the other pipeline under control of cross-forwarding control signals generated by the forwarding control logic 20. The older instruction is in this example embodiment is always issued into pipeline 0 and accordingly cross-forwarding is only required from pipeline 0 to pipeline 1.

Figure 3:
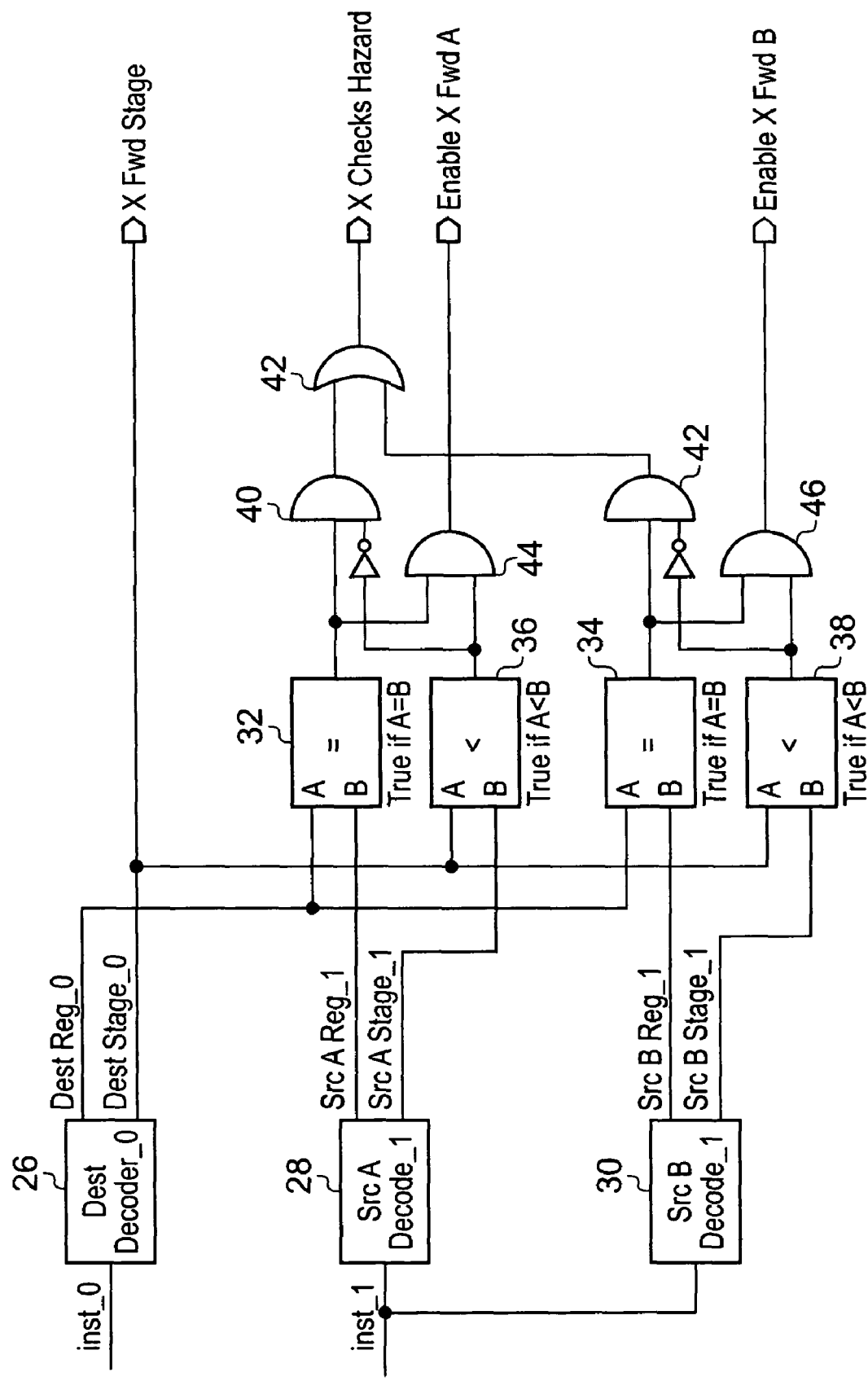
FIG. 3 is a diagram schematically illustrating a portion of a circuit for controlling instruction issue and operand cross-forwarding for instructions issued in parallel.

FIG. 3 schematically illustrates generation of the control signals for detecting that a hazard may be present and overriding that hazard together with controlling the cross-forwarding. Decoders 26, 28, 30 respectively decode the destination register specified for the older instruction as well as the two source registers specified by the younger instruction. Comparators 32, 34 determine if the destination register for the older instruction is the same as either of the source registers for the younger instruction and if this is detected, then a data hazard signal is generated.

The decoders 26, 28, 30 are also responsive to their instructions to determine the execution stage by which the destination register value will be available in the case of the older instruction and by which the source register value(s) will be required by the younger instruction. The execution stage at which these conditions are met varies depending upon the type of instruction concerned. As an example, shift instructions in the system of FIG. 1 will require their sources to be present early (at the start of execution stage E1), but will also generate their destinations early (at the end of execution stage E1). Conversely load/store operations will not require their sources to be present until much later (the start of execution stage E3), but will similarly generate their destinations much later (the end of execution stage E3). Comparators 36, 38 serve to detect whether the destination value being produced by the older instruction will be available prior to either of the source values required for the younger instruction being needed. If such a condition is present, then the output of these comparators 36, 38 can be used with the AND gates 40, 42 to override any detected data hazard signal. An OR gate 42 is responsive to any data hazard signal (for either input operand value of the younger instruction) which has not been overwritten and inhibits dual issue if such a data hazard exists and cannot be resolved by cross-forwarding. If a data hazard has been detected and has been overwritten, then the AND gates 44, 46 generate cross-forwarding enable signals for the respective source operands where this is necessary. These cross-forwarding control signals are used to control the multiplexers 22, 24 of FIG. 2 either directly or having been subject to further processing to accommodate forwarding requirements otherwise arising. Another example of further processing may involve tracking of the signal generated by the decoder 26 indicating when the destination stage will be generating its result value as at that time, or subsequent to that time, the operand value can be transmitted between the execution pipelines to resolve the data dependency.

Figure 4:
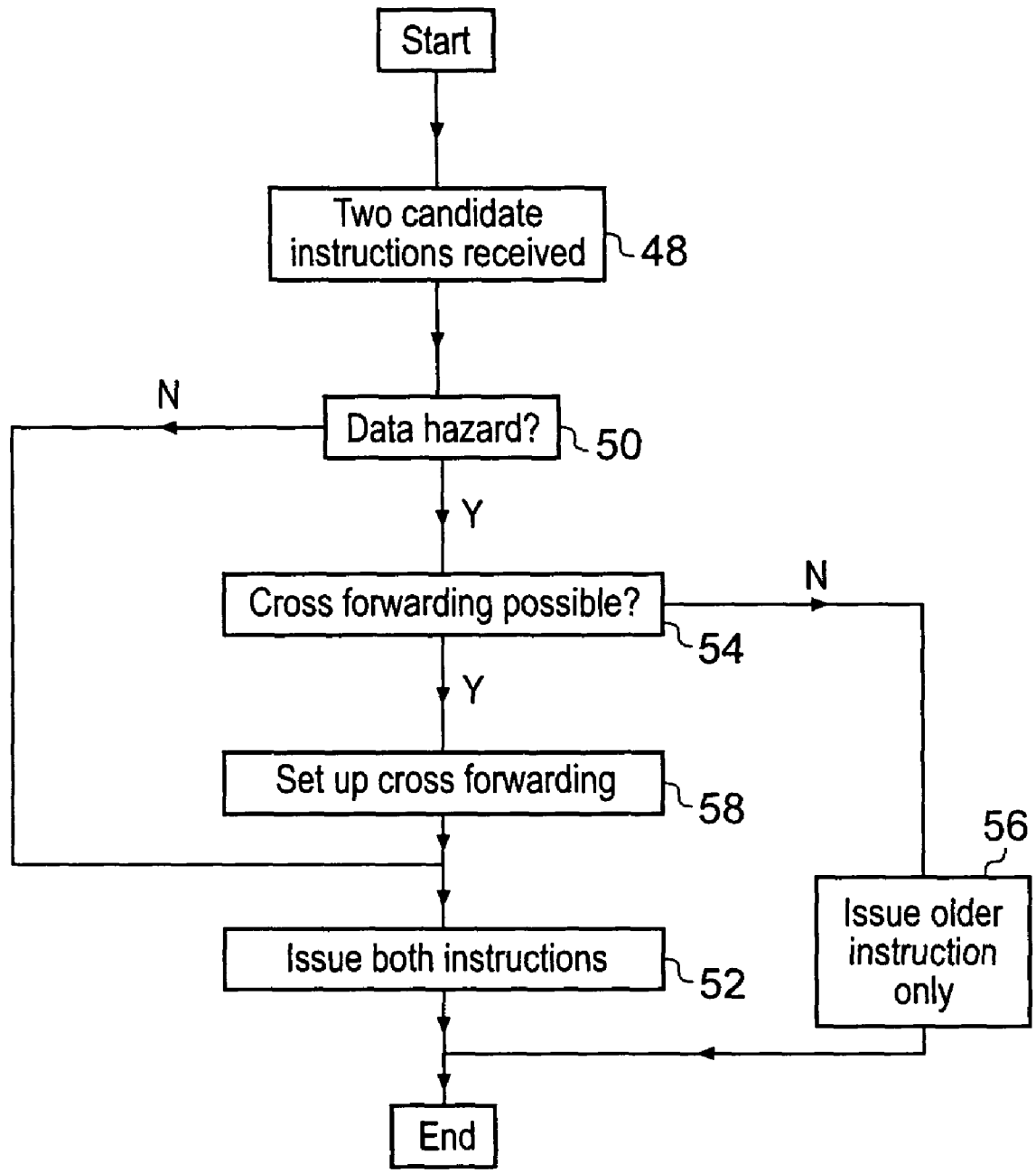
FIG. 4 is a flow diagram schematically illustrating control of instruction issue and cross-forwarding.

FIG. 4 is a flow diagram schematically illustrating control of the issue of multiple instructions. At step 48 two candidate instructions for dual issue are received. Step 50 determines whether there is a data hazard present between the two instructions, e.g. the younger instruction requires as one of its sources a value which is a destination of the older instruction. If such a data hazard does not exist, then processing can proceed to step 52 at which both instructions can be issued in parallel to the two execution pipelines.

If a data hazard is detected at step 50, then processing proceeds to step 54 at which a check is made as to whether this data hazard can be overridden due to cross-forwarding being possible. Whether or not cross-forwarding is possible will depend upon the particular type of instruction concerned. If the older instruction is a shift, then in the example of FIG. 1 this may be issued together with an ALU instruction or a load/store instruction. If the older instruction is an ALU instruction, then this may be issued in parallel with a load/store instruction. These are particular examples and are not limiting to the generality of the scope of the present technique.

If step 54 determines that cross-forwarding is not possible to overcome the data hazard detected at step 50, then processing proceeds to step 56 at which the older instruction is issued alone and the younger instruction issued in a following processing cycle providing some other data dependency does not prevent this. If cross-forwarding is determined as being suitable for overriding the data hazard at step 54, then processing proceeds to step 58 at which the necessary cross-forwarding is set up to occur at the appropriate time as the instructions progress along the execution pipelines and the two instructions are issued together at step 52.

FIG. 2 as described above illustrates the cross-forwarding paths used by instructions issued together in parallel into the two execution pipelines. It will be appreciated by those in this field that forwarding between the execution pipelines is performed for other instructions in addition to those issued at the same time in parallel to the two execution pipelines. This type of forwarding may be controlled in dependence upon the data held in the scoreboard 14 in accordance with normal techniques. The embodiment shown in FIG. 2 is simplified and in practice forwarding in either direction between the pipelines may be performed at the various stages not only to deal with instructions issued at the same time in parallel into the two pipelines but also for instructions issued at different times. The selection of which operands should be transferred between the execution pipelines and at what times can be merged for both the normal forwarding operations as controlled by the scoreboard for instructions issued at different times as well as the forwarding performed in accordance with the present technique for instructions issued together at the same time. The control signals passed along the pipeline to control the forwarding multiplexers and selection of these two different types can be merged and performed by the same hardware. The hardware which implements the forwarding need not know that the forwarding was the result of conventional scoreboard type forwarding for instructions issued at different times or was the result of forwarding for instructions issued at the same type for which is was determined that cross-forwarding between execution pipelines could resolve the data dependency even though those instructions were issued at the same time. Thus, the data hazard detection logic 12 operating with the scoreboard 14 together with the hazard override detection logic 16 together provide inputs to the forwarding control unit 20 of FIG. 2 which produces overall forwarding control signals passed down the execution pipelines with the instructions to control the forwarding resulting from both types of situation. The hazard override detection logic 16 also provides an input to the issue control logic 18 to allow parallel issue of dual instructions at the same time despite a data dependency signal from the data hazard detection logic 12 in the circumstance where forwarding control by the forwarding control logic 20 can resolve that data dependency during the progress of the two instructions along the execution pipelines.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a plurality of execution pipelines for executing in parallel program instructions of a sequence of program instruction to generate output operand values, respective execution pipelines including a corresponding plurality of execution stages, output operand values for differing types of program instructions being generated in different execution stages;
    data hazard checking logic operable to detect a data dependency hazard between candidate program instructions to be issued in parallel to respective execution pipelines of said plurality of execution pipelines whereby an output operand value for a first of said candidate program instructions is an input operand value of a second of said candidate program instructions and to generate a data dependency hazard signal if such a data dependency hazard is detected;
    data hazard override logic for detecting if said output operand value of said first of said candidate program instructions will be generated before said input operand value for said second of said candidate program instruction will be required and for generating a data hazard override signal;
    instruction issue control logic operable in response to receipt of said data hazard override signal to override any data dependency hazard signal and to permit said first of said candidate program instructions and said second of said candidate program instructions to issue in parallel; and
    operand forwarding logic operable to control said output operand value of said first of said candidate program instruction to be transmitted between execution pipelines to serve as said input operand value of said second of said candidate program instructions.

2. Apparatus as claimed in claim 1, wherein said plurality of execution pipelines comprises two execution pipelines performing in order program instruction execution.

3. Apparatus as claimed in claim 1, wherein said plurality of execution stages include respective different instruction execution logic operable to perform different data processing operations as required for execution of a program instruction progressing between said plurality of execution stages.

4. Apparatus as claimed in claim 3, wherein for at least some types of program instructions all required processing operations needed to generate at least one output operand value are complete before a last of said plurality of execution stages is reached.

5. Apparatus as claimed in claim 3, wherein for at least some types of program instructions at least one input operand value is not required until after a first of said plurality of execution stages is reached.

6. Apparatus as claimed in claim 3, wherein said respective different instruction execution logic perform one or more of:
    a data shift operation;
    an ALU operation; and
    a load/store operation.

7. Apparatus as claimed in claim 1, wherein said plurality of execution stages for respective execution pipelines lines comprises a sequence of execution stages including a shift execution stage operable to perform data shift operation, an ALU execution stage operable to perform an ALU operation and a load/store execution stage operable to perform a load/store operation.

8. Apparatus as claimed in claim 7, wherein for candidate program instructions having a data dependency hazard:
    a shift program instruction followed in a program by an ALU program instruction are issued in parallel;
    a shift program instruction followed in a program by a load/store program instruction are issued in parallel; and
    an ALU program instruction followed in a program by a load/store program instruction are issued in parallel.

9. Apparatus for processing data, said apparatus comprising:
    a plurality of execution pipeline means for executing in parallel program instructions of a sequence of program instruction to generate output operand values, respective execution pipelines including a corresponding plurality of execution stage means, output operand values for differing types of program instructions being generated in different execution stage means;

data hazard checking means for detecting a data dependency hazard between candidate program instructions to be issued in parallel to respective execution pipeline means of said plurality of execution pipeline means whereby an output operand value for a first of said candidate program instructions is an input operand value of a second of said candidate program instructions and generating a data dependency hazard signal if such a data dependency hazard is detected;

data hazard override means for detecting if said output operand value of said first of said candidate program instructions will be generated before said input operand value for said first of said candidate program instruction will be required and generating a data hazard override signal;

instruction issue control means responsive to receipt of said data hazard override signal for overriding any data dependency hazard signal and permitting said first of said candidate program instructions and said second of said candidate program instructions to issue in parallel; and operand forwarding means for controlling said output operand value of said first of said candidate program instruction to be transmitted between execution pipeline means to serve as said input operand value of said second of said candidate program instructions.

10. A method of processing data, said method comprising the steps of:

executing in parallel program instructions of a sequence of program instruction within a plurality of execution pipelines to generate output operand values, respective execution pipelines including a corresponding plurality of execution stages, output operand values for differing types of program instructions being generated in different execution stages;

detecting a data dependency hazard between candidate program instructions to be issued in parallel to respective execution pipelines of said plurality of execution pipelines whereby an output operand value for a first of said candidate program instructions is an input operand value of a second of said candidate program instructions and generating a data dependency hazard signal if such a data dependency hazard is detected;

detecting if said output operand value of said first of said candidate program instructions will be generated before said input operand value for said first of said candidate program instruction will be required and generating a data hazard override signal;

in response to generation of said data hazard override signal, overriding any data dependency hazard signal and permitting said first of said candidate program instructions and said second of said candidate program instructions to issue in parallel; and controlling said output operand value of said first of said candidate program instruction to be transmitted between execution pipelines to serve as said input operand value of said second of said candidate program instructions.

* * * * *